Dec. 13, 1955 P. GAUDILLERE 2,727,231
SYSTEMS FOR BEACONING AND RADIO POSITION DETERMINATION
Filed Aug. 6, 1952 4 Sheets-Sheet 1

Pierre Gaudillere
INVENTOR
BY Bacon & Thomas
ATTORNEYS

Dec. 13, 1955   P. GAUDILLERE   2,727,231
SYSTEMS FOR BEACONING AND RADIO POSITION DETERMINATION
Filed Aug. 6, 1952   4 Sheets-Sheet 2
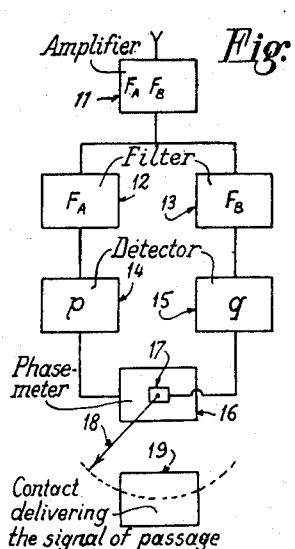
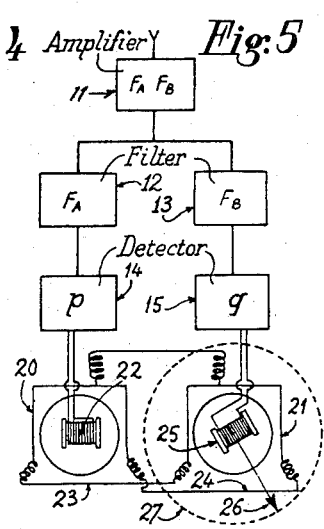
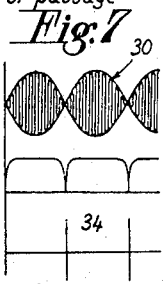
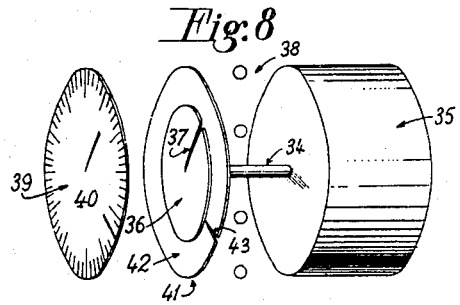
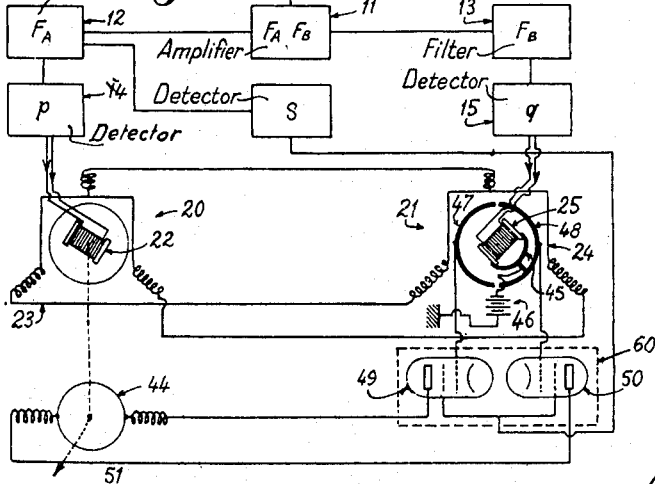
Pierre Gaudillere
INVENTOR
BY Bacon & Thomas
ATTORNEYS

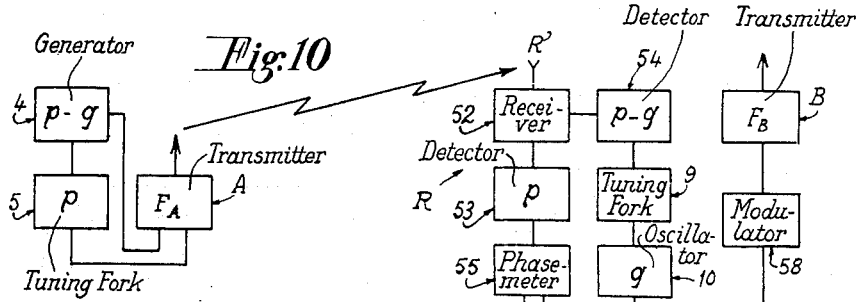

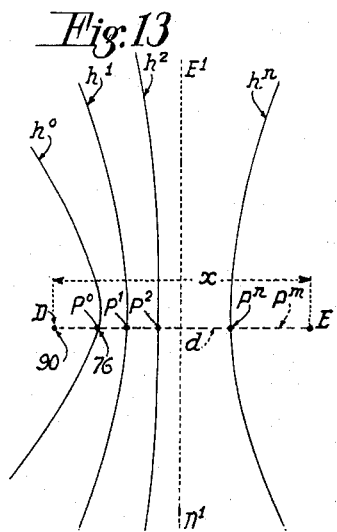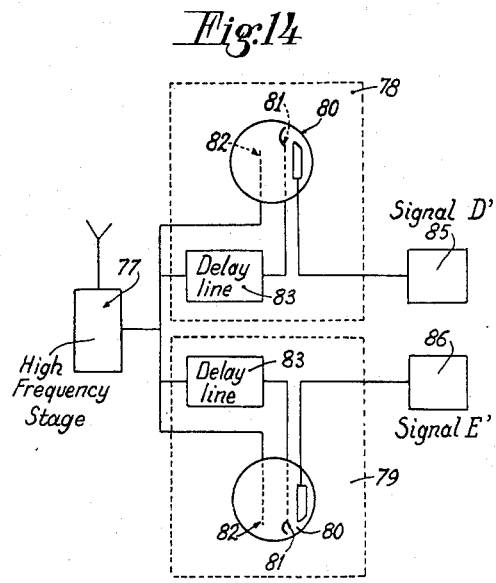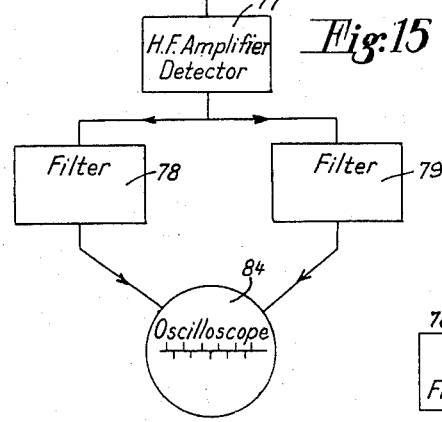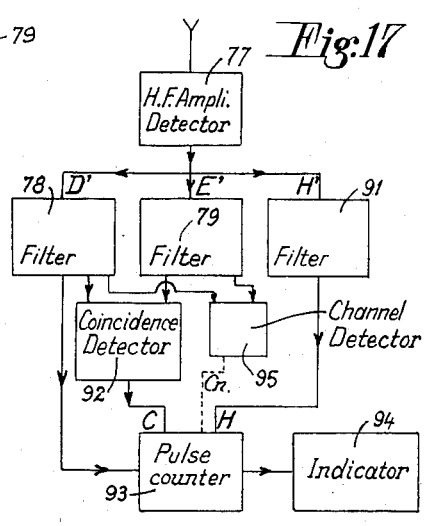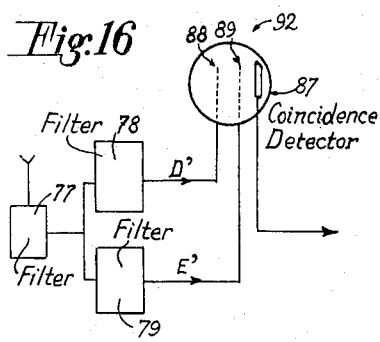
Pierre Gaudillere
INVENTOR
BY Bacon & Thomas
ATTORNEYS United States Patent Office 2,727,231
Patented Dec. 13, 1955

2,727,231

SYSTEMS FOR BEACONING AND RADIO POSITION DETERMINATION

Pierre Gaudillere, Neuilly-sur-Seine, France

Application August 6, 1952, Serial No. 302,973

Claims priority, application France August 16, 1951

20 Claims. (Cl. 343—105)

Numerous types of systems exist that permit the beaconing of space and the identification of the location of a mobile or stationary point.

Among these systems are those that enable the operator to determine his position in a given area (hereinafter termed "subjective position determination") and those that permit the determination of the position of particular points in a given area (hereinafter termed "objective position determination").

An object of the invention is to provide a system permitting both a subjective and objective position determination of radio receivers relative to radio transmitters.

Another object is to provide such a system which operates by providing in space a mobile line that is the locus of points at which the phases of signals emitted by two transmitters are equal.

A further object is to provide means whereby this position determination may be effected by utilizing modulated carrier waves, this modulation being of any kind.

A still further object is to provide means whereby it is possible to communicate from a controlling point to any selected point in a given area.

This invention is equally adaptable for the determination of the position of fixed or mobile points and is of particular use in the subjective or objective position determination of mobile objects travelling at high velocity and more specifically the subjective and objective position determination of aircraft.

In accordance with the invention, two transmitters are positioned at the two ends of a straight line forming preferably the bisecting line of the area in which position information is desired. Each transmitter emits a signal, the frequencies of these signals being different and very close to each other and subject to certain conditions hereinafter set forth.

Under these conditions, the locus of the points where the signals respectively emitted by the two abovementioned transmitters are in phase forms a substantially hyperbolic line which moves regularly from one transmitter to the other and thereby sweeps the area between these two transmitters. It is evident that if the time elapsed between the passing of the mobile line, termed isophase line, through a point of known position and its passing through the point whose position is to be determined could be measured, a first position indication of the point of unknown position would be obtained. It would suffice to emit two signals from two other transmitters whose connecting line is for example perpendicular to the connecting line between the first mentioned transmitters, to obtain a second position indication similar to the first and thence by intersection finally identify the location of the receiving point of unknown position.

The invention consists, then, in a system comprising at least one pair of transmitters, the transmitters of each pair being respectively disposed at the two ends of a straight line passing through the area in which the position information is desired, each transmitter of each pair being adapted to emit a signal, and the frequencies of these two signals being different and very near one another and so chosen that the velocity of propagation of the waves divided by the sum of the two frequencies is greater than the distance that lies between these two transmitters, and said system further comprising means for measuring the time elapsed, termed "time lag," between the reception at the point whose position is to be determined of a signal emitted by a fixed transmitter at the moment when the isophase line passes through a known position reference point arbitrarily selected, and the passage through the point of unknown position of said curve that is the locus of the points at which the two signals emitted by the two said transmitters are in phase.

Advantageously, the passage of this curve through this known position reference point is detected with the aid of a receiver termed "monitor receiver" which is situated at this point and emits a signal S which will be termed "initial signal" at the moment the curve or line in question passes through this point. Conversely, such a signal S could be emitted periodically and the signals of the transmitters A and B could be so regulated that the mobile line pass through the reference point at the instant each signal S is emitted.

The invention will be better understood and other features and advantages will appear from the ensuing description with reference to the accompanying drawing, in which:

Fig. 1 diagrammatically illustrates the area within which the position determining operations are performed.

Figs. 4, 5 and 6 illustrate three examples of devices that detect the passing of the isophase line.

Figure 1:
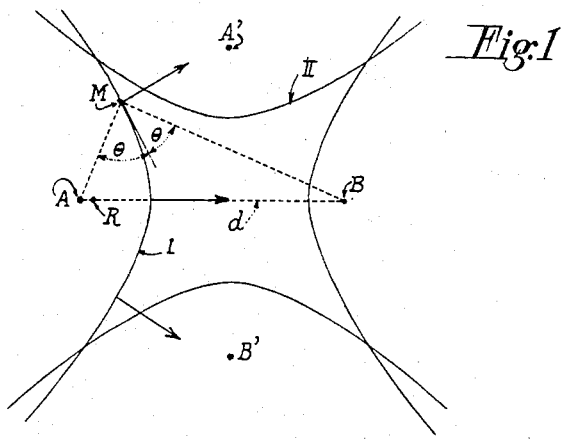

Fig. 7 diagrammatically illustrates the way in which the detecting device represented in Fig. 6 operates.

Fig. 8 diagrammatically illustrates an exploded view of a stroboscopic device for measuring the time lag.

Fig. 9 diagrammatically illustrates an electro-mechanical device for measuring the time lag.

Fig. 10 illustrates a set of transmitting systems that effect the objective and subjective position determination.

Fig. 11 illustrates the system at the point whose position is to be determined.

Fig. 12 illustrates the receiving system at the control post which effects the objective position determination.

Fig. 13 diagrammatically illustrates a part of a hyperbolic network created by two transmitters utilizing pulse modulation.

Fig. 14 diagrammatically illustrates a signal filtering and counting device.

Fig. 15 diagrammatically illustrates a part of a monitor receiver.

Fig. 16 diagrammatically illustrates a coincidence detector.

Fig. 17 diagrammatically illustrates a receiver employed in the subjective position determination by means of pulse modulated waves.

According to the illustrated embodiment, two transmitters A and B (Fig. 1) spaced apart by a distance $d$ emit respectively signals whose frequencies $p$ and $q$ are very close to one another. It will be supposed for instance that $p$ is slightly greater than $q$. If the amplitudes of these signals vary sinusoidally, the amplitudes are proportional to:

$(\sin (2\pi pt + \varphi 1)$ and $\sin (2\pi qt + \varphi 2)$ where $\varphi_1$ and $\varphi_2$ are the phases at the time origin.

At any point M where $AM = r_1$ and $BM = r_2$, the amplitude of the received signals are proportional to $$\sin\left[2\pi p\left(t - \frac{r_1}{c}\right) + \varphi 1\right]$$

and $\sin\left[2\pi q\left(t-\dfrac{r_2}{c}\right)+\varphi_2\right]$ where $c$ is the velocity of propagation of the waves.

At the instant when the phases of these two signals are equal, there is obtained:

$$2\pi p\left(t-\dfrac{r_1}{c}\right)+\varphi_1=2\pi q\left(t-\dfrac{r_2}{c}\right)+\varphi_2+2K\pi$$

where K is a whole number.

Whence:

$$t=\dfrac{pr_1-qr_2+Kc+\varphi_0}{c(p-q)}$$

wherein $$\phi_0=c\dfrac{\varphi_2-\varphi_1}{2\pi}$$

At a point M determined by the magnitudes $r_1$ and $r_2$, the phases of the two signals $p$ and $q$ are equal at the instant $t$ defined by this equation. In this equation only $r_1$ and $r_2$ are variable. In consequence at every point at which $pr_1-qr_2$ has the same value, the phases of the signals having the respective frequencies $p$ and $q$ are simultaneously equal. These points form a curve termed "Descartes oval" expressed by the equation $pr_1-qr_2=U$, where U is a constant. The shape of this curve is substantially that of a branch of a hyperbola having foci A and B if the magnitudes of $p$ and $q$ are very close to one another.

This curve moves with a continuous motion from A to B. On the axis AB, for which $r_2=d-r_1$:

$$t=\dfrac{(p+q)r_1-qd+Kc+\varphi_0}{c(p-q)}$$

The speed of the movement from A to B is $$v_0=\dfrac{dr_1}{dt}=c\cdot\dfrac{p-q}{p+q}$$

This mobile line will be termed "isophase lines" so as to distinguish it from lines often termed equiphase lines which also are the loci of points where the phases are equal but which have a purely static character.

It can be shown that at a point M at which the angle AMB is equal to $2\theta$ the speed is:

$$v=c\dfrac{p-q}{\sqrt{p^2+q^2-2pq\cos 2\theta}}$$

this speed being close to $$c\dfrac{p-q}{(p+q)\sin\theta}=\dfrac{v_0}{\sin\theta}$$

when $p$ and $q$ are close.

It is seen, then, that the speed of movement of the isophase line may be regulated at will by the selection of the frequencies $p$ and $q$. In particular they may be rendered much less than the velocity $c$ of radio waves while remaining much more than the velocity of the fastest aircraft.

Thus, extensive areas may be swept within the period of the order of a second. This provides data on the positions of mobile objects at a rate sufficiently rapid for the indication of the position obtained to be considered as practically continuous.

Taking the equation:

$$t=\dfrac{pr_1-qr_2+Kc+\varphi_0}{c(p-q)}$$

it is easily seen, since K is a whole number, that two successive passages of the isophase line through any point M occur for two values of K that differ by one, i. e. at two instants separated by an interval of time:

$$T=\dfrac{1}{p-q}$$

T will be termed the sweep period.

It is obvious that to be able to employ isophase lines for position determination it is very desirable that there exist at any given instant only one isophase line at the most in the considered area. For this, it is necessary and sufficient that the distance $d$ between the transmitters be less than that traveled through by the isophase line on the axis AB during the period T.

It is, then, necessary that:

$$d<V_0T,\text{ or }d<c\dfrac{p-q}{p+q}\cdot\dfrac{1}{p-q}\text{ or again }d<\dfrac{c}{p+q}$$

$$d<\dfrac{c}{p+q}$$

is the condition of non-ambiguity and it fixes the maximum permissible separation of the transmitters as a function of the frequencies $p$ and $q$, so that the data provided are not ambiguous.

If this condition is satisfied, it is possible to affirm that a receiver that detects at a given instant the passage of the isophase line is necessarily on a curve $pr_1-qr_2=U$, the magnitude U being determined by the instant of passing and, further, that the position of this isophase curve at the moment when it passes through the receiver is defined without ambiguity since there is only one isophase curve at a time between the transmitters.

The following points will be examined in turn:

(a) The nature of the system (general considerations).

(b) Subjective position determination (detection of the passage of the isophase curve—measurement of the time lag).

(c) Objective position determination.

(d) Selective connections with the points to be located.

THE NATURE OF THE SYSTEM

General considerations

To determine the position of a point M, there is measured the time that elapses between the reception at the point M of a signal S (hereinafter termed "initial signal") emitted by a point of reference R at the moment when the isophase line I (Fig. 1) passes through this point and the moment when the isophase line passes through the point M.

To this end, a special receiver (hereinafter termed "monitor receiver") is employed which indicates the passage of the isophase line and provokes the emission of an initial signal S at the instant to when the isophase line passes through R.

When subjective position determination is considered (Figs. 4, 5 and 10) there will be described the various devices utilized for indicating the passage of the isophase line and emitting a signal at this instant.

The point R may coincide with the point at which transmitter A is located. Advantageously the point R is placed at a distance from A that is just sufficient to permit it to receive signals other than those emitted by A. Under these conditions the signal S could be emitted by the transmitter at A. This is important for reasons hereinafter explained. This, in fact, permits recourse to another method for the production of the initial signal S as will be understood later.

From:

$$pr_{01}-qr_{02}=u_0;\ t_0=\dfrac{u_0+Kc+\varphi_0}{c(p-q)}$$

$$t_1=t_0+\dfrac{r_1}{c}=\dfrac{u_0+Kc+\varphi_0+(p-q)r_1}{c(p-q)}$$

where $t_1$ is the instant of reception of the signal S at the point M.

The time that elapses between the reception at the point M of the signal S and the passing through this point of the isophase line will be termed "time lag" $\tau$ which may be expressed:

$$\tau = t - t_1 = \frac{pr_1 - qr_2 - u_0 - (p-q)r_1}{c(p-q)} = \frac{q(r_1-r_2) - u_0}{c(p-q)}$$

The points at which the time lag is the same are situated on the branches of the hyperbolae having as foci A and B defined by the equation $r_1 - r_2 =$ constant, and which will be termed "position hyperbolae." Thus there is obtained a first position hyperbolae network which will be termed network AB.

It suffices to repeat the operation with two other transmitters A' and B' to define another isophase line II (Fig. 1). In this way another position hyperbolae network will be obtained.

The intersection of the position hyperbola of the network A'B' passing through the point M with the position hyperbola of the network AB passing through this point permits the determination of the position of the point M. Advantageously the transmitters A' and B' are placed at the ends of a straight line that is the perpendicular bisector of the straight line AB.

In order to distinguish position determination by means of the transmitters AB from determination by means of transmitters A'B', reference will be made hereinafter to position determination in network AB and position determination in network A'B'.

For this method of position determination to be practicable, it is necessary that the magnitude $v_0$ be of the order of some hundreds of kilometres per second and that of T of the order of a second. The selection of $v_0$ and T is sufficient to determine the frequencies $p$ and $q$ since:

$$v_0 = c\frac{p-q}{p+q}$$

and $$T = \frac{1}{p-q}$$

whence $$p+q = \frac{c}{v_0 T}, \quad p = \frac{c+v_0}{2v_0 T}, \quad q = \frac{c-v_0}{2v_0 T}$$

*Examples*

1. Transatlantic navigation $v_0 = 600$ km./sec., $T = 5$ sec., $p = 50 + \frac{1}{10}$, $q = 50 - \frac{1}{10}$, $d < 3000$ km.
2. Aerodrome approach area: $v_0 = 300$ km./sec., $T = 1$ sec., $p = 500 + \frac{1}{2}$, $q = 500 - \frac{1}{2}$, $d < 300$ km.
3. Landing area: $v_0 = 200$ km./sec., $T = \frac{1}{4}$ sec., $p = 3000 + 2$, $q = 3000 - 2$, $d < 50$ km.

As seen, the frequencies $p$ and $q$ that are practicable belong to the range of audio-frequencies. To transmit them it would be advantageous to emit from transmitters A and B carrier waves $F_A$ and $F_B$ which are modulated by oscillations having frequencies of $p$ and $q$. The frequencies of these carrier waves are selected solely as a function of the conditions of propagation and allocation of the frequencies. The carrier wave frequencies of A and B must, moreover, be distinct, for the modulation frequencies of $p$ and $q$ are too close to one another for their separation by low-frequency filters.

Further, it will be necessary to use for the transmitters A' and B' two other different frequencies $F_{A'}$ and $F_{B'}$ which may be modulated with the aid of the same frequencies $p$ and $q$. In practice the frequencies of the signals emitted at A and at B and at A' and at B' will be separated by some kilocycles.

The modulation of the carrier waves may be effected in accordance with any of the known methods. For instance, use may be made of:

(a) Sinusoidal modulation of the carrier wave amplitude in accordance with the above example.

(b) Sinusoidal modulation of the frequency of the carrier wave.

(c) Pulse modulation.

It is evident that in the last case there is strictly speaking no question of measuring the coincidence of phases since the waves of frequencies $p$ and $q$ are replaced by pulses. Instead of measuring phase coincidences, the coincidences of the two pulses are detected, each pulse being emitted from one of the transmitters; this defines distinct hyperbolae moving in jumps from A to B and corresponding to successive magnitudes of time lag. The space is divided by these hyperbolae into channels inside of which is the mobile object. In this case the determination of position will be effected by channels as will be subsequently described.

The specific case of transmitters modulated in amplitude by frequencies $p$ and $q$ will be considered hereinafter.

*Locking of the frequencies*

The accuracy of position determination depends essentially on the exact knowledge of the velocity $v_0$ and the accuracy with which the time lag $\tau$ is measured.

The equation $$v_0 = c\frac{p-q}{p+q}$$

shows that if a relative error in the values of $p$ and $q$ is $\Sigma$, under the worst conditions there may be a relative error in $v_0$ equal to $$\eta = \frac{p+q}{p-q} \cdot \Sigma = \frac{c}{v_0}\Sigma$$

If, for instance, $v_0 = 300$ km./sec., $\eta$ would equal $1000\Sigma$. To reduce the position error to $-\frac{1}{1000}$ of the distance AM, it would be necessary that $\Sigma = 10^{-6}$ i. e. the modulation frequencies would have to be defined to the nearest 1 millionth.

In the present state of the art such definition is not impossible but would entail a very complicated apparatus.

It is much simpler to lock the frequencies $p$ and $q$ to one another or to lock them both to a reference oscillation. The ratio $$\rho = \frac{q}{p}$$

could then be maintained constant to the nearest millionth. Similarly with the velocity $$v_0 = c\frac{1-\rho}{1+\rho}$$

Very many methods exist for the locking of the frequencies $p$ and $q$.

The frequencies may, for example, be locked by stepping down from an oscillation having a frequency that is a multiple of $p$ and $q$, or by multiplication stepping up from an oscillation having a frequency that is submultiple of $p$ and $q$.

If, for example, $p = (K+1)(p-q)$ and $q = K(p-q)$ where K and $K+1$ are two consecutive whole numbers, the frequency of the smallest common harmonic of $p$ and $q$ is: $K(K+1)(p-q)$ and the frequency of the smallest sub-harmonic: $p-q$. The only condition for this is that the frequencies $p$ and $q$ be commensurable with their difference $p-q$ i. e. exact multiples of $p-q$. Moreover, it is advantageous to have $p-q=1$ corresponding to a sweep period of one second.

By way of illustration, two devices (Figs. 2 and 3) permitting this locking, will now be described.

The first device (Fig. 2) makes use of chains of frequency multiplication or division.

A receiver 1 is employed in the proximity of the point A. It will be understood later that it coincides with the monitor receiver R that detects the signal of frequency $q$ emitted by B and this signal is applied to a frequency multiplication chain 2 which delivers the harmonic of class $K+1$. This new oscillation has for frequency $(K+1)$ $q=K(K+1)(p-q)$, i. e. the smallest harmonic common the frequencies $p$ and $q$. It is applied to a frequency demultiplication chain 3 which delivers the subharmonic oscillation of class K. The frequency of this oscillation is $$q\frac{K+1}{K}=p$$

It is employed for modulating the transmitter A.

For aiding the construction of the multiplication or demultiplication chains, it is well to select for K and $K+1$ whole consecutive numbers that are reduceable to prime factors as low as possible, for example:

$$80=2^4\times 5 \text{ and } 81=3^4$$
$$224=2^5\times 7 \text{ and } 225=3^2\times 5^2$$
$$384=2^7\times 3 \text{ and } 385=5\times 7\times 11$$

Figure 3:
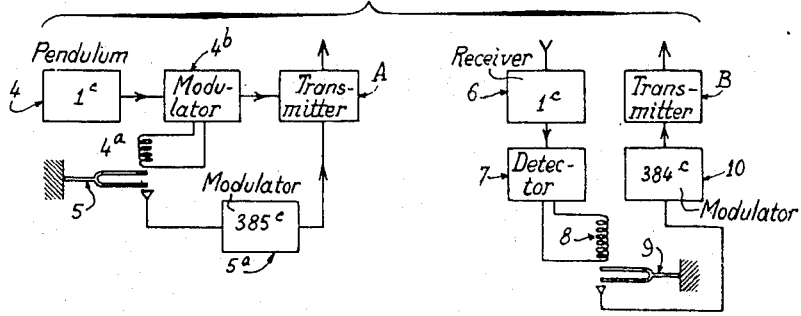

For purposes of locking the frequencies, synchronization signals emitted by the transmitter A for example may be utilized (see Fig. 3).

The transmitter A emits, for instance by means of a pendulum, synchronization pulses of frequency $p-q$, say for example $385c-384c=1$, which is the grestest subharmonic common to the frequencies $p$ and $q$. These pulses are utilized at $4^a$ for vibrating a tuning fork 5. Further, the carrier wave $F_A$ emitted by the transmitter A is modulated by the frequency $p-q$ and by the frequency $p$ with the aid of modulators $4^b$ and $5^a$. The wave $F_A$ thus modulated is received by a special receiver 6 at the transmitting station B. The pulses $p-q$ are detected at 7 and utilized to vibrate at 8 a tuning fork 9 of frequency $K(p-q)=q$ which is employed to modulate at 10 the wave $F_B$ emitted by the transmitter B.

The pulses $p-q$ are, for example, produced by a pendulum beating the second; the tuning forks utilized are in Invar metal enclosed in thermostatic containers and tuned respectively to frequencies $p$ and $q$. The very slight errors that could occur in these tunings are corrected by pulses produced in electromagnets, thereby insuring the synchronization of the oscillations of the tuning forks.

It will be understood of course that any other appropriate device could be utilized in place of the pendulum 4 and the tuning forks 5 and 9. Thus a modification of this solution would be to replace the tuning forks by chains of oscillating circuits ensuring the multiplication of the reference oscillation by the factors K and $K+1$, for example $$6\times 8\times 8=384 \text{ and } 5\times 7\times 11=385$$

Figure 2:
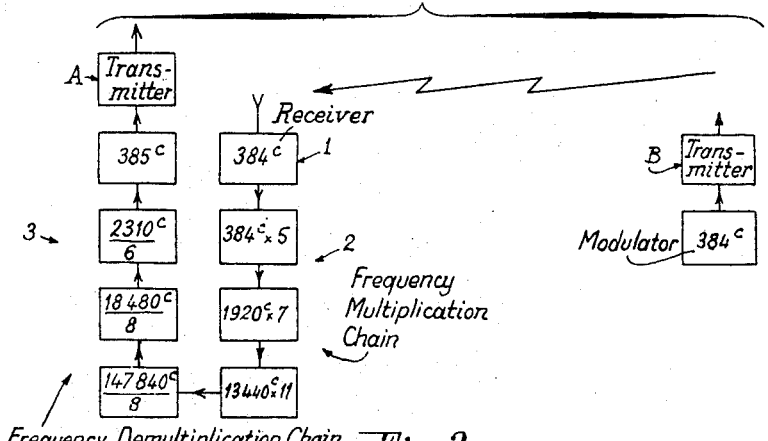
Figs. 2 and 3 illustrate two examples of the frequency locking systems.

Obviously any other frequency locking system may be utilized instead of those described and illustrated in Figs. 2 and 3. For instance, synchronous motors could be employed fed by the same network or phonic wheels actuated by a reference oscillation (such as the standard signals emitted by the official transmitters), and driving alternators through suitably calculated gear trains.

Once the problem of the locking of the frequencies is solved, the isophase lines created with the aid of signals of frequency $p$ and $q$ may be quite safely utilized both for subjective position determination and objective position determination.

The subjective position determination comprises:
(a) Detecting the passing of the isophase line.
(b) Measuring the time lag.

The objective position determination comprises causing the production at the object of unknown position by the passage of the isophase line, of a signal that permits a control post to determine the position of this object.

SUBJECTIVE POSITION DETERMINATION

*Detection of the passing of the isophase line*

The receiver at point M (Fig. 1) which seeks to determine its own position, for example the receiver on board an aircraft, comprises two high frequency channels respectively tuned to the carrier waves of the transmitters A and B. These channels deliver after detection the two signals of frequencies $p$ and $q$ whose phases have to be compared.

Several methods of phase comparison may be envisaged. Three of these methods will be described by way of example (Figs. 4, 5 and 6).

Firstly, a simple phase meter (Fig. 4) may be utilized.

The modulated signals $F_A$ and $F_B$ received by an antenna pass through an amplifier 11 and then through two filters 12 and 13 which separate them. Two detectors 14 and 15 detect the signals of frequency $p$ and $q$. The current having one of these frequencies, the frequency $p$ for example, is applied with the usual dephasing to the windings of a phase meter 16 whereas a current of frequency $q$ is applied to the rotor winding 17 of this phase meter.

The pointer 18 of the phase meter 16 rotates, then, with a frequency equal to $p-q$, say for example one rotation per second in the case when $p=385$ and $q=384$. When the pointer 18 passes through the position at which the difference of phase between currents having respective frequencies of $p$ and $q$ is nil, it encounters a contact 19 and this contact delivers a pulse that constitutes the signal of the passage of the isophase line through the point M.

According to a particularly advantageous modification (Fig. 5), the phase meter 16 could be replaced by two selsyns 20 and 21. The rotor 22 of the selsyn 20 is locked and is fed by the current of frequency $p$ from the detector 14. The windings 23 and 25 of the two selsyns 20 and 21 are connected in series phase by phase. The rotor 25 of the selsyn 21 is fed by the current of frequency $q$ from the detector 15. Under these conditions, the rotor 25 rotates at the frequency $p-q$ which is the frequency of the sweeping of the isophase lines.

The pointer 26 is driven by the rotor 25 and rotates before a dial 27. It provokes an emission of a signal at the moment when the isophase line passes through the point M, i. e. when the dephasing between the currents having respective frequencies $p$ and $q$ is nil, as in the case illustrated in Fig. 4.

Of course any other phase meter may be utilized, provided it allows the accurate detection of the instant when the phase difference is nil.

As an example of isophase line detecting systems not employing a phase meter, a system making use of beat signal between signals having frequencies $p$ and $q$ (Figs. 6 and 7) will be mentioned.

The two oscillations of frequencies $p$ and $q$ detected as in the case illustrated in Figs. 4 and 5 are brought to equal levels then applied in opposition to a mixer 28.

The mixture thus obtained gives:

$$\sin(2\pi pt+\varphi_1)-\sin(2\pi qt+\varphi_2)=$$
$$2\cos\left(2\pi\frac{p+q}{2}t+\frac{\varphi_1+\varphi_2}{2}\right)\sin\left(2\pi\frac{p-q}{2}t+\frac{\varphi_1+\varphi_2}{2}\right)$$

There is obtained, then, an oscillation of frequency $$\frac{p+q}{2}$$

modulated by a beat signal having a frequency $$\frac{p-q}{2}$$

(Fig. 7). This beat signal is detected at 29 and its positive alternations 30 amplified at 31 are squared at 32 and derived at 33 thereby providing pulses 34 of frequency $p-q$ which correspond with the instants when $2\pi pt+\varphi_1=2\pi pt+\varphi_2$; i. e. with the passing of the isophase line.

*Measurement of time lag*

It will be recalled that "time lag" is the term given to the time that elapses between the reception of the initial signal S at a point M whose position is to be determined and the passing through this point of the isophase line.

It has been indicated that the emission of the signal S by the transmitter A (or transmitter B) may be provoked by the detection effected with the aid of a monitor receiver, of the passing of the isophase line through a point R arbitrarily chosen and advantageously situated in proximity to the transmitter A (or transmitter B). This signal S is therefore emitted for a fixed time lag $\tau R$ at the point R.

The emission of this signal is effected by any known method, for example the method employed in the emission of standard frequency signals, and comprises modulating a carrier wave (which may be that from transmitter A or transmitter B) by means of a particular frequency $f_0$ (which is as a rule different from the frequencies $p$ and $q$) and varying the modulated signal in such manner as to allow through only a few alternations for each signal S to emit.

The receiver includes a low frequency filter which is tuned to the frequency $f_0$ and thus gives a pip at the reception of each signal S.

It will be understood that under these conditions, the signal S could be directly transmitted from the point A instead of provoking its emission by the passage of the isophase line at the point R, by giving this signal the frequency of the sweeping effected by the isophase line and using it as the initial signal with the only condition that the phase of the signal of frequency $p$ or that of signal $q$ is so regulated that the time lag at the point R always conserves the fixed value $\tau R$ mentioned above.

Under these conditions the time lag measured at a given point M is the same whatever be the method of emitting the initial signal S.

Very many kinds of time lag measuring devices may be employed. The time lags to measure are of the order of a second and must be determined to the nearest $\frac{1}{1000}$, which renders fairly delicate the employment of an independent time measuring device at the point whose position is to be determined, for example on board the mobile object. It is preferable to effect these measurements with the aid of apparatuses locked to the frequencies $p$ and $q$ and which therefore provide a time basis common to all the receivers of the area.

Some examples of time measuring devices will be described, but it is obvious that any other device may be employed.

*Stroboscopic indicator (Fig. 8)*

A simple solution consists in utilizing for measuring the time lag the phase meters (Figs. 4 and 5) utilized for the detection of the passing of the isophase line.

The shaft 34 of such a phase meter illustrated at 35 (Fig. 8) drives an opaque disc 36 provided with a radial slit 37. This disc rotates between one or several neon tubes 38 and a translucid graduated dial 39 coated with a phosphorescent coating 40 whose luminous remanence is of the order of $$\frac{1}{p-q}$$

seconds, i. e. substantially equal to the period of sweeping T of the isophase line. When the phase meter 35 rotates, the slit 37 passes through the zero graduation at the moment when the phase shift between the currents of frequency $p$ and $q$ is nil, i. e. at the moment of the passing of the isophase line. Furthermore, it is arranged that the reception of the signal S provokes the lighting up of the neon tube or tubes 38. Under these conditions, the luminous line that appears on the dial indicates the graduation corresponding to the time lag.

The utilization of the phase meter having two selsyns (Fig. 5) is particularly recommended in the case of the stroboscopic device just described. Since the precision of the positioning of a selsyn is of the order of ¼ of a degree, an accuracy is obtained that is greater than $\frac{1}{1000}$.

A second disc 41 concentric with the first, transparent at its centre and provided with an opaque ring 42 that surrounds the disc 36 and is provided with a radial slit 43, may be rotated at $n(p-q)$ revolutions per second by means of a gearing and in this way aid the reading. The graduation is then read as on the dial of a watch especially if $n=12$ and if the selsyn rotates in an anticlockwise direction.

*Electro-mechanical indicator (Fig. 9)*

It is very useful to replace the purely visual signal provided by the stroboscopic indicator of Fig. 8 by the movement of a mechanical member. In this way the amplitude of this movement may be read on a suitable dial and the moved mechanical member may be utilized as a driving member, for instance for controlling a delay line, as will be hereinafter explained.

The devices having two selsyns above described (Fig. 5) enable a particularly useful electromechanical indicator to be constructed (Fig. 9).

The rotor 22 of the selsyn 20 fed by the current of frequency $p$, which was keyed in the device illustrated in Fig. 5, is in the indicator of Fig. 9 driven by a motor 44.

The rotor 25 of the selsyn 21 rotates at the speed $(p-q)$ revolutions per second, as in the example in Fig. 5, and drives a brush 45 connected to a source 46 of direct current. This brush rubs on two collectors 47 and 48 each of which forms half a cylinder and is disposed so that their common generatrix corresponds to the position of no phase shift between signals having frequencies $p$ and $q$.

The two semi-cylinders 47 and 48 are connected respectively to one of the grids of pentodes 49 and 50. These pentodes are thus blocked alternately during intervals of time of $$\frac{1}{2(p-q)} \text{ second} = \frac{T}{2}$$

The initial signal S is fed to the other grid of each of these two pentodes, and the pentode which is unblocked at the moment this signal is received delivers a current that tends to rotate the motor 44. This rotation occurs in one direction when the pentode 49 is operative and in the opposite direction when the pentode 50 is operative. The motor 44 drives the rotor 22. It stops if the signal S is received at the instant when the brush passes through the point of no phase shift that corresponds to the gap that separates the two semi-cylinders 47 and 48. This motor drives moreover a pointer 51 moving across a dial, or preferably two geared-down pointers whose indications are read as the time on a watch. The stopping of the motor corresponds to the instant when the rotor 22 has been so displaced that the reception of the signal S and the passing of the brush 45 at the point of no phase shift coincide in time.

*Electronic indicator*

A very accurate method of measuring the time lag comprises emitting, for example by transmitters A and B, synchronization pulses the frequency of which is advantageously locked with that of the signal S (the frequency $p$ could, for instance, be utilized to this end), thereafter computing with the aid of an electronic computer the number of these pulses received at the point M whose position is to be determined between the reception of the initial signal S and the moment when the isophase line passes therethrough.

Many other methods of measuring the time lag may be envisaged and those herein described are given of course only by way of example.

OBJECTIVE POSITION DETERMINATION

Objection position determination comprises causing the point M of unknown position (which may be for example on board a moving object such as an aircraft) to emit a signal L termed hereinafter position signal at the moment when the isophase line passes through this point receiving this signal L and deriving therefrom the position of the point M.

Thus the signal of the different points of unknown position dispersed over the surveyed area are emitted at different instants and a single wave length may be utilized for the entire area.

The signal L emitted by the point M at the moment of the passing of the isophase line could be received at a control post surveying the area on the grid of a cathode tube the sweeping of which would be controlled by the initial signal S and would have, then, the same frequency as that of the sweeping effected by the isophase line.

Under these conditions the luminous spot would occupy at each instant on the screen of the cathode tube a position which would correspond to the position of the point M in the network AB (Fig. 1), the distance AB being represented on the screen by the total travel effected by the spot.

It would suffice to utilize a second cathode tube for the network A'B' (Fig. 1) for determining the position of the emission point M in this latter network. Thus for example by projection on a third screen there could be obtained by intersection the position of the point M on two coordinates one along the axis AB and the other along the axis A'B'.

It is, however, much more preferable to replace the two cathode tubes by a single television tube and proceed as follows.

Signals of frequency $n.s$, i. e. having a frequency that is a multiple of the frequency $s$ of the initial signals, are emitted. The frequency $n.s$ is locked with the frequency $s$. Hence, the area surveyed is divided into $n$ channels delimited by what will be termed hyperbolae of coincidence along which these signals of frequency $n.s$, emitted in the form of pulses or transformed into pulses at the point whose position is to be determined, are received at the moment of phase coincidence. It is arranged moreover that the emission of the signals L corresponding to the passing of the isophase line through the points of unknown position situated between two of these hyperbolae of coincidence is so delayed that this emission takes place upon the passing of the isophase line through the first hyperbola of coincidence that the isophase line encounters after passing through the point of unknown position.

In this way all the signals L relative to the points situated in the channel comprised between two hyperbolae of coincidence are in a sense sorted out and emitted at the moment of the passage of the isophase line through the hyperbola of coincidence that delimits this channel in the direction of motion of the isophase line.

The screen will show, therefore, in which channel of the network AB the point of unknown position is located. Position determination in the network AB is effected, therefore, by channels.

Now, if the line frequency of the television tube which receives the signals L is given the value $n.s$, it would suffice, to obtain the second coordinate necessary for determining the position of the point M, to delay the signal L for a period proportional to the time lag $\tau M$ corresponding to the network A'B' and varying from zero to $$\frac{1}{n.s}$$

It will be observed that while the determination of position is effected by channels in the network AB, it is effected in a continuous way in the network A'B'.

Hence, if the distance AB and the distance A'B' are each divided into a thousand graduations and it is assumed that the exact coordinates of the mobile point are 350 and 455 respectively along AB and A'B' and the network AB is divided into 250 channels, the spot of the signal L will be positioned on the television tube screen on the coordinate 455 along A'B' and on the coordinate 352 along AB (line 88).

By way of illustration, various systems utilized in accordance with the invention for effecting a subjective and objective position determination will now be described. At the same time there will be described how a connection could easily be conveniently established between the control post where the objective position determination is effected and any point of unknown position in the surveyed area, for example between a control post and any one among several aircraft within this area.

Fig. 10 illustrates a unit of the transmitting systems adapted to effect the position determination.

At station A a generator 4 produces pulses having the frequency $p-q$. These pulses vibrate a tuning fork 5 having a frequency $p$. The carrier wave $F_A$ emitted by the transmitter is modulated to the frequencies $p$ and $p-q$.

The pulses $p-q$ serve as the initial signals S.

The signal of frequency $p$ provides the synchronizing pulses $n.S$ for the objective position determination.

At station B the antenna 52 situated at point R' receives the wave $F_A$ modulated to the frequency $p$ and to the frequency $p-q$.

The detector 53 detects the signal of frequency $p$.

Further, a detector 54 detects from the wave $F_A$ a current of frequency $p-q$ which as in the case of the Fig. 5 drives a tuning fork 9 having a frequency $q$.

So long as the isophase line passes through R' at such intervals that the time lag $\tau R'$ remains constant i. e. so long as the signals $p$ and $p-q$ are locked in frequency and in phase, the motor 44 remains stationary. As soon as the time $\tau R'$ changes, the control device 57 having two pentodes 49 and 50 (Fig. 9) provokes the rotation of the motor 44. The phase shifter 56 acts on the phase of the current of frequency $q$ and re-establishes the situation.

The carrier wave $F_B$ of the transmitter B is modulated at 58 to the frequency $q$.

Thus the signal S of frequency $p-q$ and signal $nS$ of frequency $p$ are locked in frequency and in phase.

Fig. 11 illustrates the device for the objective position determination and the selective connection to the point M of unknown position.

The amplifier 11 receives the two modulated waves $F_A$ and $F_B$. Filters 12 and 13 separate these two waves. Detectors 14 and 15 detect the signals of frequency $p$ and $q$. These frequencies are transmitted to the two selsyns 20 and 21 of the phase-meter 59 which is similar to that of Fig. 9 provided with a motor 44 and a control device 60 which permits the time lag for each position to be read on the indicator $60^a$. The passage of the isophase line provokes the emission of a signal of frequency $p-q$. This signal is transformed at $60^b$ into a squared signal of duration $$\frac{1}{p}$$

The signal of frequency $p$ is transformed at $60^c$ by clipping and derivation, into pulses having a frequency $p$. These pulses are fed to the grid 61 of a pentode 62 the other grid 63 of which receives the squared signals of duration $$\frac{1}{q}$$

Thus only the pulse of frequency $p$ which immediately follows the passage of the isophase line is passed by the pentode 62.

The signal emitted by the pentode 62 is delayed for a time proportional to the time lag $\tau'M$ corresponding to the network A'B' (Fig. 1) and varying from zero to $$\frac{1}{p}$$

This is effected by means of a delay line 63ª (Fig. 11) controlled by the indicator 64 pertaining to the network A'B' and identical to that shown in Fig. 9. To this end, the indicator 64 could drive a variable capacitor 63ᵇ forming part of the delay line and having a capacity that varies in a continuous way as a function of the time lag indicated by the indicator 64, its time constant varying in a continuous manner by an amount comprised between zero and $$\frac{1}{p}$$

The signal thereby obtained which constitutes the above-mentioned signal L is transmitted to a transmitter 65 the carrier wave $F_L$ of which it modulates.

Fig. 12 illustrates the system utilized at the control post for receiving the signal emitted by the transmitter 65 of Fig. 11.

The receiver 66 receives the modulated signal $F_L$ and detects the signal L which is applied to the Wenhelt grid 67 of a television tube 68.

Further, the signal $F_A$ is received at 69. The detectors 70 and 71 respectively provide the signal S of frequency $s=p-q$ and the signal of frequency $p$. These signals are respectively transmitted to the line and field synchronizers 72 and 73. The spot 74 which appears on the screen 75 gives the position of the point M.

It is evident that a receiver similar to that of the control posts (Fig. 12) could be placed at all points M of unknown position.

The signal L emitted from and received at the point M on board the mobile object would be fed to the grid of the television tube and cause to appear on the screen thereof for instance a very bright spot indicating the position of the mobile object on the map on which hyperbolae of coincidence are drawn.

The reception of the signals of position from the other mobile objects could, for example, cause to appear on the screen spots of less intensity. In this way an excellent anti-collision device is obtained.

However, such a device which is relatively cumbersome and costly could not replace, at least on light aircraft, the simple position indicators hereinbefore described.

SELECTIVE CONNECTIONS

Apart from subjective and objective position determination the systems in accordance with the invention enable the operator of the post that effects the objective position determination to put himself selectively in communication with any point having a suitable receiver within the area where the determination of position is operated.

To this end, the control post (Fig. 12) comprises on the screen 75 two cursors 76 and 77 perpendicular to one another. These cursors are respectively mechanically connected to the phase shifters 78 and 79 which receive the signals S and S' respectively pertaining to the network AB and A'B' and impart thereto phaseshifts respectively corresponding to time lags $\tau$ and $\tau'$ pertaining to the point whose position is defined on the screen 75 by the cursors 76 and 77. The signal S is transmitted from the detector 70. The signal S' is transmitted from the detector 80ª which detects the signals S' from the wave $F'_{A'}$ received by the receiver 81. The transmitter 82 therefore emits two key signals C and C'.

Each of the points whose positions are to be determined possesses two pentodes 83 and 84 (Fig. 11). One grid of each of these pentodes receives respectively the passage signal of the network AB and A'B' formed respectively at 60ᵇ and 60ᵈ. The other control grids of each of these same pentodes respectively receive the signals C and C' emitted by the transmitter 82. When the two signals coincide in their two pentodes 83 and 84, two relays close at 85 and unlock the receiver 86 during a time at least equal to the period of sweeping T.

Hence, only the aircraft selected by the operator of the control post by means of the cursors 76 and 77 receives his messages.

PULSE MODULATION

It has been stated that the modulation of the respective carrier waves $F_A$ and $F_B$ by the signals of frequency $p$ and $q$ may be effected by any of the known methods.

In the described example, it had been supposed that the modulation utilized was the sinusoidal modulation of the amplitude of the carrier waves.

The particular features of the case in which pulse modulation is employed will now be considered.

It is obvious that in this case there is no question of detecting phase coincidences at any point in the surveyed area since the modulating waves of frequency $p$ and $q$ are replaced by pulses having these frequencies, two successive pulses being separated by silent intervals. Under these conditions, instead of detecting phase coincidences the simultaneous reception at a point of two pulses will be detected, one of these pulses being emitted by transmitter D and the other by the transmitter E (Fig. 13). This coincidence occurs along a certain number of distinct hyperbolic lines. Position determination will be effected, therefore, by channels.

Furthermore, it should be noted that if the sinusoidal signals in the receiver are transformed, in accordance with the normal practice of clipping and derivation, into pulses, it will be found that the coincidences of these pulses thus obtained correspond to the moment at which the phase shift between the sinusoidal signals of frequency $p$ and $q$ is nil. In other terms, it is seen that the coincidence of the pulses occurs along position hyperbolae along which the phase shift is nil.

The coincidence hyperbola thus created moves therefore by bounds from D toward E if, as was supposed, $p$ is slightly greater than $q$.

The same may be explained in the following way:

Assume that a line of coincidence (Fig. 13) forms at the instant $t_0$ on the branch of the hyperbola intersecting the line that passes through the two transmitters D, E at a point $P_0$, such that $DP_0=x_0$ and $P_0E=d-x_0$. Along this line of coincidence occurs the meeting of signal $D_0$ emitted at D at the instant $$t_0-\frac{x_0}{c}$$

and signal $F_0$ emitted at E at the instant $$t_0-\frac{d-x_0}{c}$$

where $c$ is the velocity of wave propagation.

A new signal $E_1$ is emitted at E at the instant $$t_0-\frac{x_0}{c}+\frac{1}{p}$$

and a new signal $B_1$ is emitted at B at the instant $$t_0-\frac{d-x_0}{c}+\frac{1}{q}$$

The meeting of these two signals on the straight line DE occurs at point $P_1$ having abscissa $x_1$, at an instant $t_1$. Thus:

$$t_1=t_0-\frac{x_0}{c}+\frac{1}{p}+\frac{x_1}{c}=t_0-\frac{d-x_0}{c}+\frac{1}{q}+\frac{d-x_1}{c}$$

From which $$x_1-x_0=c\frac{p-q}{2pq}$$

and $$t_1-t_0=\frac{p+q}{2pq}$$

Similarly, any of the successive signals emitted at D, for example $D_n$ emitted at the instant $$t_0 - \frac{x_0}{c} + \frac{n}{p}$$

and the corresponding signal $E_n$ emitted at E at the instant $$t_0 - \frac{d-x_0}{c} + \frac{n}{q}$$

would meet at a point $p_n$, having abscissa $x_n$ at an instant $t_n$ and:

$$x_n - x_0 = c \cdot n \frac{p-q}{2pq}$$

and $$t_n - t_0 = n \cdot \frac{p+q}{2pq}$$

The line of coincidence, which as already mentioned very nearly coincides with the isophase line, is formed at intervals of time $$t = \frac{p+q}{2pq}$$

on the branches of confocal hyperbolae having focii D and E intersecting DE at points spaced apart a distance $$e = c \frac{p-q}{2pq}$$

The line of coincidence of the signals moves thus from D toward E and coincides successively with the position hyperbolae $h_0, h_1 \ldots h_n$ that would correspond with the no phase shift between the signals of frequency $p$ and $q$ if the latter were constituted by sinusoidal oscillations. The isophase line which coincides with these position hyperbolae therefore traverses by bounds the space comprised between B and E at a mean apparent velocity $$v = \frac{e}{t} = c \frac{p-q}{p+q}$$

Beyond a point $p_m$ where $P_mE < e$ there is no longer coincidences between the corresponding signals emitted at D and E because the signal $DK_{m+1}$ attains and passes the point E before the instant when the signal $E_{m+1}$ is emitted there.

Of course, the same conditions of non ambiguity as that indicated in the case when the signals of frequency $p$ and $q$ are formed by sinusoidal oscillations, must be satisfied:

$$VT > d \text{ that is } c \frac{p-q}{p+q} \cdot \frac{1}{p-q} = \frac{c}{p+q} > d$$

where T is the sweep period of the isophase line.

Advantageously, pulse transmitters are used having the same carrier frequency for the two transmitters D and E. The high frequency chains of the two transmitters may be independent of each other. The emission frequencies are stabilized in the usual way.

The carrier wave is modulated by stabilized pulse generators having a frequency in general not exceeding 1000 cycles.

Each signal emitted by the transmitters D and E receives a particular form. It may be, for instance, a double pulse separated by a different interval of time for each of the transmitters, say an interval $a$ for transmitter D and $b$ for transmitter E.

As in the aforementioned case of amplitude modulation, the frequencies $p$ and $q$ must be locked so that the sweep period T is constant.

In this case this locking may be achieved in the following manner:

A receiver termed monitor receiver is disposed in proximity to the transmitter A. This receiver comprises a high frequency chain 77 tuned to the carrier frequency common to the two transmitters E and D. Two filters 78 and 79 separate the signals $E_n$ and $D_n$. Each filter is essentially composed of a pentode 80 whose grids 81 and 82 are connected by a delay line 83 whose time constant is set at value $a$ for the filter 78 and $b$ for the filter 79. Under these conditions, the tube 80 remains blocked so long as its two grids 81 and 82 do not receive simultaneously a pulse. When this occurs, i. e. when the two grids are simultaneously polarized respectively by one of the components of the double pulse emitted by the corresponding transmitter, these components being separated by a time $a$ and $b$ according to the transmitter that is equal to the time constant of the corresponding delay line, the tube 80 emits and delivers a local signal D' and E'.

The monitor receiver may be employed in different ways for ensuring the stability of the network i. e. for ensuring that the coincidence signal has the period T of the isophase line.

Thus, the signals D' and E' delivered by the filters 78 and 79 may be applied to an oscilloscope 84, the signal D' being received there in the form of an upwardly directed spot and the signal E' in the form of a downwardly directed spot. The time base of the oscilloscope 84 is equal to T. The operator observes at a fixed point on the screen the coincidence of the points corresponding to a signal A' and a signal B'. A multiplication of the sweep velocity by a whole number permits this coincidence to be measured with great accuracy. If this coincidence no longer occurs, the operator reestablishes it by means of a hand control which enables him to remote-control the modulator from the transmitter D in suitably modifying the phase of this oscillator.

A simple calculation shows that if the frequencies $p$ and $q$ are defined with a relative accuracy $\Sigma$, the signals D' and E' that coincide at instant $t_0$, may be displaced by $2\Sigma T$ at the start of the following travel, which represents a phase correction equal to $4\Sigma Tp = 4\Sigma(K+1)$ radians of the oscillator.

The relative error $\Sigma$ may be easily reduced to $10^{-4}$ or $10^{-5}$ and K is of the order of 100 to 1000. The phase shift to effect is, then, of a few degrees at the most. It is achieved by adjusting the rotor of a variable capacitor inserted in one of the modulation chain circuits.

Alternatively, the stability of the network may be obtained by locking the frequencies $p$ and $q$ as hereinbefore described.

Thus, each time a mobile object possessing a detector capable of detecting the coincidence of the signals emitted by the transmitters D and E is located on a coincidence hyperbola, the coincidence signal emitted by this detector provides it with an absolutely unambiguous indication of its position.

The unit for detecting the coincidence of the signals emitted by the transmitters D and E may, for example, comprise two filters 78 and 79 similar to those included in the monitor receiver (Fig. 14).

The filters 78 and 79 emit signals D' and E' which are applied to the coincidence detector itself (Fig. 16), the latter is in essential composed of a pentode tube 87 that emits a coincidence signal when its two grids 88 and 89 respectively connected to the filters 78 and 79 simultaneously receive signals E' and D'.

To determine on what coincidence hyperbola the point of unknown position is located, the time lag is measured in the same way as in the case of amplitude modulation. To this end, the monitor receiver emits a coincidence signal just as the receiver described above. This signal emitted by the monitor receiver controls a modulator 90 associated with the transmitter A to which it transmits through space a signal H in the form of a double pulse the two components of which are separated by a time interval $w$ that is different from the intervals $a$ and $b$.

Further, the receiver of the mobile object or of any other point whose position is to be determined, comprises, after the high frequency stage 77, three filter circuits (Fig. 17) 78, 79, 91 separately detecting the signals $D'_n$, $E'_n$, and $H'_n$. The signals $D'_n$ and $E'_n$ are applied, as hereinbefore described, to a coincidence detector 92 (Fig. 16) that emits a signal when two signals $D_n$ and $F_n$ are received simultaneously.

If such a receiver is located on the first coincidence line, it receives the signal S substantially at the instant $t_0$, i. e. at the moment when the simultaneous reception of the signals $D_0$ and $E_0$ provokes therein the formation of the coincidence signal. If the receiver is located on the coincidence hyperbola $n$, it still receives the signal H at the instant $t_0$, for the time to transmit the signal H may be neglected. On the other hand, the coincidence signal is formed in this receiver at the moment of the reception of the signal $D_n$, i. e. at the instant $t_0+nt$. Now, $$nt = n\frac{p+q}{2pq} \approx n \cdot \frac{1}{p}$$

Thus, between the signals H and C the receiver has received $n$ signals emitted by A. It suffices, then, to count these signals during this interval of time to obtain the number of the curve upon which the mobile object is located.

To this end, the mobile object comprises a pulse counter 93 (Fig. 17). This counter is set into operation by the signal H and stopped and then re-set to zero by the signal C (signal emitted by the receiving point at the moment when this point lies on a isophase line). This signal C at the same time causes the registration of the number of the coincidence line on which the mobile object is located whatever be the point and the direction in which the mobile object penetrates the area covered by the network of coincidence hyperbolae.

If the receiver is located between two lines $n-1$ and $n$, it of course detects no coincidence for in this case the isophase line moves by bounds. It is to be observed in this respect that the signal $D_{n-1}$, reaches it a little later than the signal $E_{n-1}$, while the signal $D_n$ reaches it a little before the signal $E_n$. Thus, when the coincidence line passes from the curve $n-1$ to the curve $n$, the receiver receives two signals $D_{n-1}$ and $D_n$ consecutively and not separated by a signal E. If the space comprised between the coincidence hyperbolae $n-1$ and $n$ is termed channel number $n$, the position of the mobile object could be defined by a detector 95 disclosing the succession of two signals A unseparated by a signal E. By means of these signals this detector of channel 95 emits then, a signal $C_h$ which in being fed to the counter 93 of the signals D mentioned above, causes it to register the number $n$ of the channel containing the receiver (Fig. 17).

Several different methods for producing this channel signal may be envisaged.

For instance, the following method may be employed. Pulses D' and E' from the filters 78 and 79 are regulated at equal amplitudes and are fed to the grid of a thyratron. The connections are such that pulses D' give a positive voltage and pulses E' a negative voltage. Further, the positive voltage fed by the pulse D' is slightly less than that necessary for energizing the thyratron. When voltages corresponding respectively to the pulses emitted at D and E are successively fed to the grid of the thyratron, one cancels the other. At the moment when a pulse $D'_{n-1}$ is followed by a pulse $D'_n$, without a pulse E' interposed therebetween, the two voltages combine, the thyratron is energized and a signal $C_h$ is emitted and fed to the counter instead of the signal C (Fig. 17). This signal indicates that the mobile object is located between the hyperbolae corresponding to the coincidence curves $n-1$ and $n$, for the detected instant is the instant when the isophase line coincides with the coincidence hyperbola $n$ which is nearest the mobile object in the direction of motion of the isophase line. In other terms, the counter registers at each instant the number of the channel wherein the receiving point, say an aircraft, is located, i. e. the number of the curve having the higher figure of the number of the two coincidence hyperbolae delimiting the channel in question. At the moment when the mobile object passes through a hyperbola, it is the number of the hyperbola that follows, in either direction, the number of the hyperbola previously registered that appears.

A coverage permitting a complete position determination is obviously constitued by two superposed networks of the above described type, these networks utilizing either the same carrier wave and differing modulating frequencies $p$ and $p_1$, $q$ and $q_1$ or different carrier waves and the same modulating frequencies. Two receivers tuned to the frequencies of these two networks permanently ensure the registering of the two numbers of the two channels, one in each channel which contain the point whose position is to be determined. In this way the indication of the "mesh" containing this point is obtained automatically and without ambiguity.

It is moveover possible to arrange that the transmitters D of the first network coincide with the transmitter $D_1$ of the second network. The coverage then employs a single carrier frequency but the five signals D', E', H', $H'_1$ and $D'_1$ are of different forms. The receiver of the point whose position is to be determined comprises five filters.

With respect to objective position determination and selective connections, there is no difference between the system employing pulse modulation and the system employing amplitude modulation by sinusoidal oscillation. It is obvious, however, that objective position determination is in this case carried out by channels along both coordinates instead of being carried out by channels along one coordinate and continuously along the other as in the case of amplitude modulation.

The invention is not limited to the details of construction described and illustrated in the accompanying drawing which were given merely by way of example.

Having now described my invention what I claim as new and desire to secure by Letters Patent is:

1. In a system for determining the position of a receiving point relative to spaced transmitters; at least one pair of spaced transmitters for emitting a signal from each, the signals emitted by the transmitters of each pair having different frequencies very close to one another and of such values that the velocity of propagation of the waves in kilometers per second divided by the sum of the frequencies in cycles per second is greater than the distance in kilometers between said two transmitters of each said pair, whereby an isophase line is created which constitutes the locus of the points at which said two signals are in phase and which moves from one of said transmitters to the other, only one such line existing at any given instant, phase measuring means for detecting the passage of such isophase line through a known point fixed in position, means for emitting an initial signal from a point of known position, at the moment of such passage, additional phase measuring means for detecting the passage of said isophase line through said receiving point, and time measuring means for measuring the time lag between the reception of said initial signal at said receiving point and the passage of said isophase line through said receiving point.

2. A system as claimed in claim 1 comprising means for locking the frequencies of said two signals.

3. A system as claimed in claim 1 including two of said pairs of transmitters, the transmitters of one pair being placed at the two ends of an axis passing through the centre of the area wherein the position determination is carried out and the transmitters of the other pair being placed at the ends of another axis passing through the centre of said area, said two axes being substantially perpendicular to one another.

4. In a system for determining the position of a receiving point relative to spaced transmitters; at least one pair of spaced transmitters for emitting a signal from each, having a carrier component and a modulation component constituted by a sinusoidal signal, the carrier components all having different frequencies and the modulation signals emitted by the transmitters of each pair having different frequencies very close to one another and of such values that the velocity of propagation of the waves in kilometers per second divided by the sum of the frequencies in cycles per second is greater than the distance in kilometers between said two transmitters of each said pair, whereby an isophase line is created which constitutes the locus of the points at which said two signals are in phase and which moves in a continuous way from one of said transmitters to the other, only one such line existing at any given instant, phase measuring means for detecting the passage of such isophase line through a known point fixed in position, means for emitting from this point an initial signal at the moment of such passage, additional phase measuring means for detecting the passage of said isophase line through said receiving point, and time measuring means for measuring the time lag between the reception of said initial signal at said receiving point and the passage of said isophase line through said receiving point.

5. In a system for determining the position of a receiving point relative to spaced transmitters; at least one pair of spaced transmitters for emitting from each one a signal having a carrier component and a modulation component constituted by a sinusoidal signal, the carrier components all having different frequencies and the modulation signals emitted by the transmitters of each pair having different frequencies very near to one another and of such values that the velocity of propagation of the waves in kilometers per second divided by the sum of the frequencies in cycles per second is greater than the distance in kilometers between said two transmitters of each said pair, whereby an isophase line is created which constitutes the locus of the points at which said two signals are in phase and which moves in a continuous way from one of said transmitters to the other, only one such line existing at any given instant, means for emitting from one of said transmitters an initial signal, means for regulating the phase of at least one of said modulation signals in such a way that the passage of said isophase line through a reference point arbitrarily selected coincides with the moment of the emission of each initial signal, phase measuring means for detecting the passage of said isophase line through said receiving point, and time measuring means for measuring the time lag between the reception of said initial signal at said receiving point and the passage of said isophase line through said receiving point.

6. A system as claimed in claim 5 including means for modulating with the initial signal the carrier wave emitted by said transmitter that emits said initial signal.

7. In a system for determining the position of a receiving point relative to spaced transmitters; at least one pair of spaced transmitters including a first and a second transmitter, means at the first transmitter for emitting a first carrier wave and a modulation initial signal having a first frequency which is the highest common sub-multiple of a second and a third frequency which are different and very close to one another and such that the velocity of propagation of the waves in kilometers per second divided by the sum of the frequencies in cycles per second is greater than the distance in kilometers between said two transmitters, means for said first transmitter for obtaining by multiplication from said first frequency a signal having said second frequency, means for modulating with said first and second frequencies said first carrier wave, at said second transmitter means for emitting a second carrier wave, means for receiving said first modulated carrier wave, means for detecting said first frequency, means for obtaining by multiplication from said first frequency said third frequency, means for modulating with said third frequency said second carrier wave, whereby an isophase line is created which constitutes the locus of the points at which the signals having said second and third frequency are in phase, this line moving in a continuous way from one transmitter to the other, phase measuring means for detecting the passage of such isophase line through a fixed point situated in immediate proximity to one of said transmitters, means for regulating the phase of at least one of said modulation signals in such a way that the passage of said isophase line through a reference point coincides with the moment of the emission of said initial signal, phase measuring means for detecting the passage of said isophase line through said receiving point and time measuring means for measuring the time lag, between the reception of said initial signal at said receiving point and the passage of said isophase line through said receiving point.

8. In a system for determining the position of a receiving point relative to spaced transmitters; at least one pair of spaced transmitters for emitting a signal from each, having a carrier component and a modulation component constituted by a sinusoidal signal, the carrier components all having different frequencies and the modulation signals emitted by the transmitters of each pair having different frequencies very close to one another and such that the velocity of propagation of the waves in kilometers per second divided by the sum of the frequencies in cycles per second is greater than the distance in kilometers between said two transmitters of said pair, whereby an isophase line is created which constitutes the locus of the points at which said two signals are in phase and which moves in a continuous way from one of said transmitters to the other, only one such line existing at any given instance, phase measuring means for detecting the passage of such isophase line through a known point fixed in position, means for emitting from this point an initial signal at the moment of such passage, phase measuring means for detecting the passage of said isophase line through said receiving point and time measuring means for measuring the time lag between the reception of said initial signal at said receiving point and the passage of said isophase line through said receiving point said means for detecting the passage of the isophase line comprising means for receiving said two modulated carrier waves, means for filtering each of these carrier waves, means for detecting the modulation signal of each of these waves, a phasemeter comprising two perpendicular stator windings and a rotor provided with a winding and a pointer, means for feeding one of said modulating signals to one of said stator windings, means for shifting the phase of this same signal 90° and feeding it to the other of these stator windings, means for feeding the other of said modulation signals to said rotor winding, and means for producing a signal at the moment when said pointer passes through the position of no phase shift between the two said signals.

9. In a system for determining the position of a receiving point relative to spaced transmitters; at least one pair of spaced transmitters for emitting a signal from each, having a carrier component and a modulation component constituted by a sinusoidal signal, the carrier components all having different frequencies and the modulation signals emitted by the transmitters of each pair having different frequencies very close to one another and of such values that the velocity of propagation of the waves in kilometers per second divided by the sum of frequencies in cycles per second is greater than the distance in kilometers between said two transmitters of said pair, whereby an isophase line is created which constitutes the locus of the points at which the said two signals are in phase and which moves in a continuous way from one of said transmitters to the other, only one such line existing at any given instant, phase measuring means for detecting the passage of such isophase line through a known point fixed in position, means for emitting from this point an initial signal at the moment of such passage, additional phase measuring means for detecting the passage of said isophase line through said receiving point and time measuring means for measuring the time lag between the reception of said initial signal at said receiving point and the passage of said isophase line through said receiving point to said two transmitters, said means for detecting the passage of the isophase line comprising means for receiving said two modulated carrier waves, means for filtering each of these carrier waves, means for detecting the modulation signal of each of these carrier waves, a phasemeter comprising a first selsyn and a second selsyn the stator windings of which are connected phase by phase, means for feeding to the rotor of said first selsyn said first modulation signal and means for locking this rotor, means for feeding to the rotor of said second selsyn said second modulation signal, a pointer driven by said second rotor and means for producing a signal at the moment when said pointer passes through the position of no phase shift between the signals feeding said two rotors.

10. In a system for determining the position of a receiving point relative to spaced transmitters; at least one pair of spaced transmitters for emitting a signal from each, having a carrier component and a modulation component constituted by a sinusoidal signal, the carrier components all having different frequencies and the modulation signals emitted by the transmitters of each pair having different frequencies very close to one another and of such values that the velocity of propagation of the waves in kilometers per second divided by the sum of the frequencies in cycles per second is greater than the distance in kilometers between said two transmitters of said pair, whereby an isophase line is created which constitutes the locus of the points at which said two signals are in phase and which moves in a continuous way from one of said transmitters to the other, only one such line existing at any given instant, phase measuring means for detecting the passage of such isophase line through a known point fixed in position, means for emitting from this point an initial signal at the moment of such passage, additional phase measuring means for detecting the passage of said isophase line through said receiving point and time measuring means for measuring the time lag between the reception of said initial signal at said receiving point and the passage of said isophase line through said receiving point, said means for measuring the time comprising a disc provided with a radial slit, means for driving this disc in rotation by means of said measuring means utilized for detecting the passage of the isophase line, at least one luminous tube placed behind said disc, means for causing the lighting of this tube at the moment of the reception of said initial signal, and a graduated disc placed in front of said disc and concentric therewith covered with a fluorescent coating the remanence of which has a duration substantially equal to that of the sweeping period of such isophase line.

11. In a system for determining the position of a receiving point relative to spaced transmitters; at least one pair of spaced transmitters for emitting a signal from each, having a carrier component and a modulation component constituted by a sinusoidal signal, the carrier components all having different frequencies and the modulation signals emitted by the transmitters of each pair having different frequencies very close to one another and such that the velocity of propagation of the waves in kilometers per second divided by the sum of the frequencies in cycles per second is greater than the distance in kilometers between said two transmitters of said pair, whereby an isophase line is created which constitutes the locus of the points at which said two signals are in phase and which moves in a continuous way from one of said transmitters to the other, only one such line existing at any given instant, phase measuring means for detecting the passage of such isophase line through a known point fixed in position, means for emitting from this point an initial signal at the moment of such passage, additional phase measuring means for detecting the passage of said isophase line through said receiving point and time measuring means for measuring the time lag between the reception at this point of said initial signal at said receiving point and the passage of said isophase line through said receiving point, said means for measuring said time lag comprising a first and a second selsyn the stator windings of which are connected phase by phase, means for feeding said modulation signals respectively to the rotor windings of said two selsyns, a brush driven by one of said rotors, two half-cylinders insulated one from the other upon which said brush is adapted to rub in its rotation, two pentodes, one of the grids of each pentode being connected to one of these half-cylinders, means for feeding said initial signal to the other grid of each of said pentodes, a motor arranged to drive the rotor of the other selsyn, means for feeding said motor through each of said pentodes, means for measuring the rotation of said motor, whereby said motor stops when the instant of the passage of said brush through the point corresponding to the no-phase shift coincides with the instant of the reception of the initial signal.

12. In a system for determining the position of a receiving point relative to spaced transmitters; a first and a second pair of transmitters, the transmitters of each pair being respectively positioned at the two ends of a straight line passing through the area within which the position determination is carried out and these straight lines intersecting, means for emitting from each transmitter a different carrier wave, in each pair means for emitting from each one of the transmitters a modulation signal of sinusoidal form, the frequencies of these modulation signals emitted by the transmitters of the same pair being different and very near one another and such that the velocity of propagation of the waves in kilometers per second divided by the sum of the frequencies in cycles per second is greater than the distance in kilometers between said two transmitters of the pair, whereby is created for each pair of transmitters an isophase line that constitutes the locus of the points at which said two modulation signals are in phase and which moves in a continuous way from one of said transmitters to the other, only one such line existing at any given instant, in each of said pairs, phase measuring means for detecting the passage of such isophase line through a known point fixed in position, means for emitting from this point an initial signal at the moment of such passage, additional phase measuring means for detecting the passage of said isophase line through said receiving point and time measuring means for measuring the time lag between the reception of said initial signal at said receiving point and the passage of said isophase line through said receiving point, means for emitting a passage signal, at the moment of the passage of the isophase line pertaining to one of said pairs through said receiving point, means for emitting from one of said transmitters of one of said pairs pulsed reference signals that have a frequency equal to $n$ times the frequency of the initial signal of said pair, whereby the area comprised between the two transmitters of the considered pair is divided into $n$ channels by hyperbolae termed hyperbolae of coincidence that constitute the locus of the points at which the passage of the isophase line pertaining to this pair of transmitters and the reception of said reference signals occur simultaneously, means for delaying said passage signal pertaining to the same pair of transmitters until the moment when the isophase line the passage of which had caused this signal coincides with the first hyperbola of coincidence that follows the point whose position is to be determined in the direction of movement of the isophase line, means for retransmitting said passage signal thus delayed, means for delaying the same signal for a length of time proportional to the time lag corresponding to said second pair of transmitters that varies from zero to the period of said reference signal, a television tube, means for receiving on the grid of this tube said signal, means for applying said reference signal to the line frequency synchronizer of this tube and means for applying to the field frequency synchronizer said initial signal pertaining to said first pair of transmitters.

13. A system as claimed in claim 12 further comprising two cursors perpendicular to one another placed in front of the screen of the television tube, means for receiving the initial signals pertaining to said first and said second pair of transmitters respectively, two delay lines controlled by these cursors for respectively delaying said two initial signals by a length of time respectively equal to the two time lags respectively relative to each of said two pairs of transmitters and proper to the point whose position is defined on said television screen by the intersection of said two cursors, means for emitting said signals thus delayed, at the point whose position is to be determined, two receiving channels normally blocked and the unblocking of which respectively necessitates simultaneously the reception of the signal of the passage of the isophase line and the reception of said delayed signal, both said signals relating to the same pair of transmitters, and a receiver that is unblocked by the unblocking of said channels.

14. In a system for determining the position of a receiving point relative to spaced transmitters; at least one pair of spaced transmitters for emitting a signal from each having a carrier component and a modulation component constituted by a signal comprising at least one pulse, said signals having different frequencies very close to one another and such that the velocity of propagation of the waves in kilometers per second divided by the sum of the frequencies in cycles per second is greater than the distance in kilometers between said two transmitters of said pair, whereby an isophase line is created which constitutes the locus of the points at which said two modulation signals are received at the same time and which moves by bounds from one transmitter to the other, only one such line existing at any given moment, means for detecting at a fixed point of known position the passage of such isophase line, means for emitting from a point of known position an initial signal, at said receiving point means for producing a position signal at the moment of simultaneous reception of said two modulation signals when said point is on said line, means, when said receiving point is not on the isophase line, for ascertaining when two signals of the same transmitter are received consecutively at said receiving point without the reception of a signal from the other transmitter between these two signals, and means for producing a position signal, indicating the reception of said two consecutive signals, and means for counting the number of signals received from one of said transmitters between the reception of said initial signal and the formation of one of said position signals.

15. In a system as claimed in claim 14 means for counting said signals comprising an electronic computer adapted to be put into operation by each of said initial signals and be re-set to zero by the following position signal.

16. In a system as claimed in claim 14 in which said reference point is located at the point where the hyperbola of coincidence nearest to one of said transmitters intersects the straight line that connects said two transmitters, means for emitting said initial signal from the transmitter nearest to said reference point.

17. In a system for determining the position of a receiving point relative to spaced transmitters; a first and a second pair of transmitters, the transmitter of each pair being respectively positioned at the two ends of a straight line passing through the area within which the position determination is carried out and these two straight lines intersecting, means for emitting from each of the transmitters of each pair a carrier wave, this wave being different for each pair of transmitters, in each pair of transmitters, means for emitting from each transmitter a modulation signal for modulating this carrier wave that is composed of at least one pulse, the form of these signals being such that they may be filtered separately, said modulation signals having for the same pair of transmitters frequencies different and very near to one another and such that the velocity of wave propagation in kilometers per second divided by the sum of the frequencies in cycles per second is greater than the distance in kilometers between said two transmitters of said pair, whereby an isophase line is created that constitutes the locus of the points at which said modulation signals are simultaneously received, said lines only one of which at the most exists at any given moment moving by bounds from one transmitter to the other, and the space between said two transmitters is divided into channels by hyperbolae termed hyperbolae of coincidence, means for detecting the passage of said isophase line at a fixed reference point of known position, means for emitting from this point an initial signal which is composed of at least one pulse and is of such form that it may be filtered separately from said two modulation signals, at said receiving point means for producing a position signal at the moment of the simultaneous reception of said two modulation signals when said point is located on this line, means when said receiving point is not located on an isophase line for ascertaining the consecutive reception of two consecutive signals from the same transmitter at said receiving point without the reception of a signal from another transmitter between the two, and means for producing a position signal at the moment of this consecutive reception, means for counting the number of signals received from one of said transmitters between the reception of said initial signal and the formation of one of said position signals, means for retransmitting said position signal relating to said first pair of transmitters, means for delaying this signal for a length of time varying from zero to the period of said signal emitted by said transmitter relating to said first pair and proportional to said number of counted pulses relating to said second pair, a television tube, means for receiving on the grid of this tube said position signal, means for applying said signal emitted by one of the transmitters of said second pair to the line frequency synchronizer of this tube and means for applying said initial signal relating to said first pair of transmitters to the field frequency synchronizer of this tube.

18. A system as claimed in claim 17 further comprising two cursors perpendicular to one another placed in front of the screen of the television tube, means for receiving the initial signals pertaining to said first and said second pair of transmitters respectively, two delay lines controlled by these cursors for respectively delaying said two initial signals by a length of time respectively equal to the two time lags respectively relative to each of said two pairs of transmitters and proper to said receiving point whose position is defined on said television screen by the intersection of said two cursors, means for emitting said signals thus delayed, at said receiving point two receiving channels normally blocked and the unblocking of which, respectively necessitates simultaneously the reception of the signal of the passage of the isophase line and the reception of said delayed signal, both said signals relating to the same pair of transmitters, and a receiver that is unblocked by the unblocking of said channels.

19. In a system for determining the position of a receiving point relative to spaced transmitters; a first and a second pair of transmitters, the transmitters of each pair being respectively positioned at the two ends of a straight line passing through the area within which the position determination is operated and these lines intersecting, means for emitting a different carrier wave from each transmitter, in each pair of transmitters means for emitting from a first transmitter a modulation signal having a first frequency termed initial signal which is the highest common sub-multiple of a second and a third frequency which are different and very near to one another and such that the velocity of wave propagation in kilometers per second divided by the sum of the frequencies in cycles per second is greater than the distance in kilometers between said two transmitters, means at said first transmitter for obtaining by multiplication from said first frequency a signal having said second frequency, means for modulating said first carrier wave by said first and second frequencies, at said second transmitter means for emitting a second carrier wave, means for receiving said modulated first carrier wave, means for detecting said first frequency, means for obtaining by multiplication from said first frequency said third frequency, means for modulating said second carrier wave with said third frequency, whereby an isophase line is created which constitutes the locus of the points at which the signals having said second and third frequency are in phase, this line moving in a continuous way from one transmitter to the other, phase measuring means for detecting the passage of such isophase line through a fixed point situated in immediate proximity to one of said transmitters, means for regulating the phase of at least one of said modulation signals so that the passage of the isophase line through a reference point coincides with the moment of the emission of said initial signal, phase measuring means for detecting at said receiving point the passage of said isophase line and means for measuring the time that elapses between the reception at this point of said initial signal and the passage of said isophase line through said receiving point, means for emitting a passage signal at the moment of the passage of the isophase line relating to one of said pairs of transmitters at said receiving point, means for transforming said signal having said second frequency into pulses of the same frequency, whereby the area comprised between the two transmitters is divided into $n$ channels by hyperbolae of coincidence, which constitute the loci of the points at which the passage of the isophase line and the formation of said pulses occur simultaneously, means for transforming this passage signal into a squared signal having a duration equal to the period of the signal having said second frequency, a tube having several grids which is normally blocked, means for unblocking this tube by applying said pulses to one of the grids of this tube and said squared signals to the other, a delay line comprising a variable capacity and being adapted to delay said pulses by a length of time varying from 0 to the period of said signal having said second frequency relating to said first pair of transmitters, means for varying the magnitude of said capacity by means of said time lag measuring means relative to said second pair of transmitters in proportion to the time lag, means for causing said signal transformed into pulses to pass through this delay line, means for retransmitting said delayed signal, a receiver comprising a television tube, means for receiving said retransmitted signal on the grid of said television tube, means for applying the signal having said second frequency relating to said first pair of transmitters to the line frequency synchronizer of this tube, and means for applying said signal having said first frequency relating to said first pair of transmitters to the field frequency synchronizer of this tube.

20. A system as claimed in claim 19 further comprising two cursors perpendicular to one another placed in front of the screen of the television tube, means for receiving the initial signals pertaining to said first and said second pair of transmitters respectively, two delay lines controlled by these cursors for respectively delaying said two initial signals by a length of time respectively equal to the two time lags respectively relative to each of said tube pairs of transmitters and proper to the point whose position is defined on said television screen by the intersection of said two cursors, means for emitting said signals thus delayed, at said receiving point two receiving channels normally blocked and the unblocking of which respectively necessitates simultaneously the reception of the signal of the passage of the isophase line and the reception of said delayed signal both said signals relating to the same pair of transmitters, and a receiver that is unblocked by the unblocking of said channels.

References Cited in the file of this patent

UNITED STATES PATENTS

| | | |
|---|---|---|
| 1,942,262 | Shanklin | Jan. 2, 1934 |
| 2,050,276 | Chubb | Aug. 11, 1936 |
| 2,141,282 | Southworth | Dec. 27, 1938 |
| 2,419,525 | Alford | Apr. 29, 1947 |
| 2,436,376 | Bown | Feb. 24, 1948 |
| 2,514,436 | Alvarez | July 11, 1950 |